July 29, 1952 M. R. PURVIS 2,605,347

TELEGRAPH CONCENTRATION BOARD SPARE COMMUNICATION CIRCUIT

Filed April 29, 1949 3 Sheets-Sheet 1

INVENTOR
M. R. PURVIS
BY John E. Cassidy
ATTORNEY

July 29, 1952 M. R. PURVIS 2,605,347

TELEGRAPH CONCENTRATION BOARD SPARE COMMUNICATION CIRCUIT

Filed April 29, 1949 3 Sheets-Sheet 2

MANUAL TELEGRAPH CORD CIRCUIT

INVENTOR
M. R. PURVIS
BY John E. Cassidy
ATTORNEY

July 29, 1952 M. R. PURVIS 2,605,347

TELEGRAPH CONCENTRATION BOARD SPARE COMMUNICATION CIRCUIT

Filed April 29, 1949 3 Sheets-Sheet 3

INVENTOR
M. R. PURVIS
BY John E. Cassidy
ATTORNEY

Patented July 29, 1952 2,605,347

UNITED STATES PATENT OFFICE 2,605,347

TELEGRAPH CONCENTRATION BOARD SPARE COMMUNICATION CIRCUIT

Matthew R. Purvis, Fanwood, N. J., assignor to Bell Telephone Laboratories, Incorporated, New York, N. Y., a corporation of New York Application April 29, 1949, Serial No. 90,514

3 Claims. (Cl. 178—2)

This invention relates to telegraph systems and more particularly to telegraph systems wherein private branch lines are associated together in local, statewide, or nationwide networks on a semipermanent basis as distinguished from a telegraph exchange switching system, which latter resembles a telephone exchange system in function. Such networks may now be administered at so-called telegraph service boards where telegraph line and loop concentration groups are built up and connected by means of lines to other concentration groups in other cities as required for the needs of various patrons such as large corporations. Such concentration groups may remain undisturbed for relatively long intervals such as for days or weeks at a time. By means of a special repeater system known as a hub-type repeater in which the individual repeater units through which the lines and loops are interconnected at each concentration group point do not require adjustment to compensate for differing line or loop characteristics, each concentration group is arranged so that lines to other concentration groups at distant cities as well as local circuits may be added, subtracted or substituted directly by an operator at the service board instead of requiring the services of maintenance men or repeater adjusters whenever a change is necessary as formerly. This results in more efficient operation. In order to permit this to be done it is necessary to add an individual repeater component of the hub-type repeater to each line or loop in a concentration group. Telegraph service board operation is described in Patents 2,349,586 and 2,413,686 granted May 23, 1944 and January 7, 1947, respectively, to A. R. Bonorden et al. The circuits of the present invention are designed for operation in service generally resembling that described in the foregoing patents.

An object of this invention is the improvement of arrangements for terminating spare telegraph branch lines which may at times be employed commercially as part of a network in a telegraph service board and which may at other times be used also for interoffice communication between service board attendants for maintenance and other purposes.

Another object of this invention is the provision of means for completing a call received over one branch telegraph line, which line is arranged for dual use as a part of a network or as a spare communication channel, to another office over a second similar branch telegraph line, and automatically signaling the called office over the line.

The arrangements described herein provide for the connection of an answering jack circuit to each terminal of a spare line dual facility which may serve as part of a network or as a maintenance line and which is known in the art as a communication spare facility, commonly designated a KSP facility. Thus, at each end, such a facility in addition to its concentration jack circuit is also terminated in an answering jack circuit. As thus arranged such a facility may serve at times as a part of a commercial network and at other times as a maintenance facility. This flexibility tends to reduce the cost.

First, to describe the operation of the circuits in general terms, in the idle condition the line facility is marking in both directions. An attendant originates a call by connecting the manual telegraph cord circuit to the communication spare jack, KSP jack, in the communication spare terminating circuit in the particular facility, such as Fig. 1 or Fig. 3, extending to the desired service board, and sending a two-second space signal. The space signal is transmitted over the line facility and causes the answering lamp to light at the telegraph service board in the called distant office where the call is answered with a manual telegraph cord circuit. Each manual telegraph cord circuit includes a telegraph key and sounder. The two attendants may communicate over the single line facility and if the call is ultimately destined for another more distant telegraph service board, so that a tandem connection is required, the answering attendant takes the calling end of a different cord circuit which does not include a telegraph key and sounder, namely a telegraph connecting cord circuit and connects it to the answering jack circuit of a communication spare facility that terminates in the more distant called office. This causes a spacing signal to be sent over the second communication spare facility. The attendant at the through or intermediate point immediately disconnects the manual telegraph cord circuit from the answering jack circuit of the incoming line from the calling office and replaces it with the answering cord of the telegraph connecting cord circuit. This stops the space or calling signal that was started by connecting the calling cord of the telegraph connecting cord circuit to the answering jack circuit of the communication spare facility extending to the more distant office. The attendant at the more distant called office answers with a manual telegraph cord circuit and communication between the calling and called attendants may proceed.

The telegraph connecting cord circuits which are employed for extending a connection through an intermediate point do not include means for communication with the attendant at the intermediate point but do include supervisory signal controls. This makes the connecting cord circuit relatively inexpensive.

At the end of the conversation the attendant at either the calling or called office in the tandem connection sends a 20-cycle ringing signal which causes a supervisory lamp in the telegraph connecting cord circuit at the intermediate office to light. This notifies the attendant at the intermediate office that the telegraph connecting cord circuit should be disconnected from the answering jack circuits of the two communication spare facilities extending toward the calling and called offices.

The invention may be more fully understood from the following description when read with reference to the associated drawings in which:

Figs. 1 and 3 represent line facilities connected to communication spare terminating circuits each of which includes communication spare jack KSP, answering lamp ANS, resistances 108, 109, 113, 114, 116, 132, tube 111, condenser 107, relays A and SA and batteries 110, 117 and 115;

Figures 1, 2, 3:
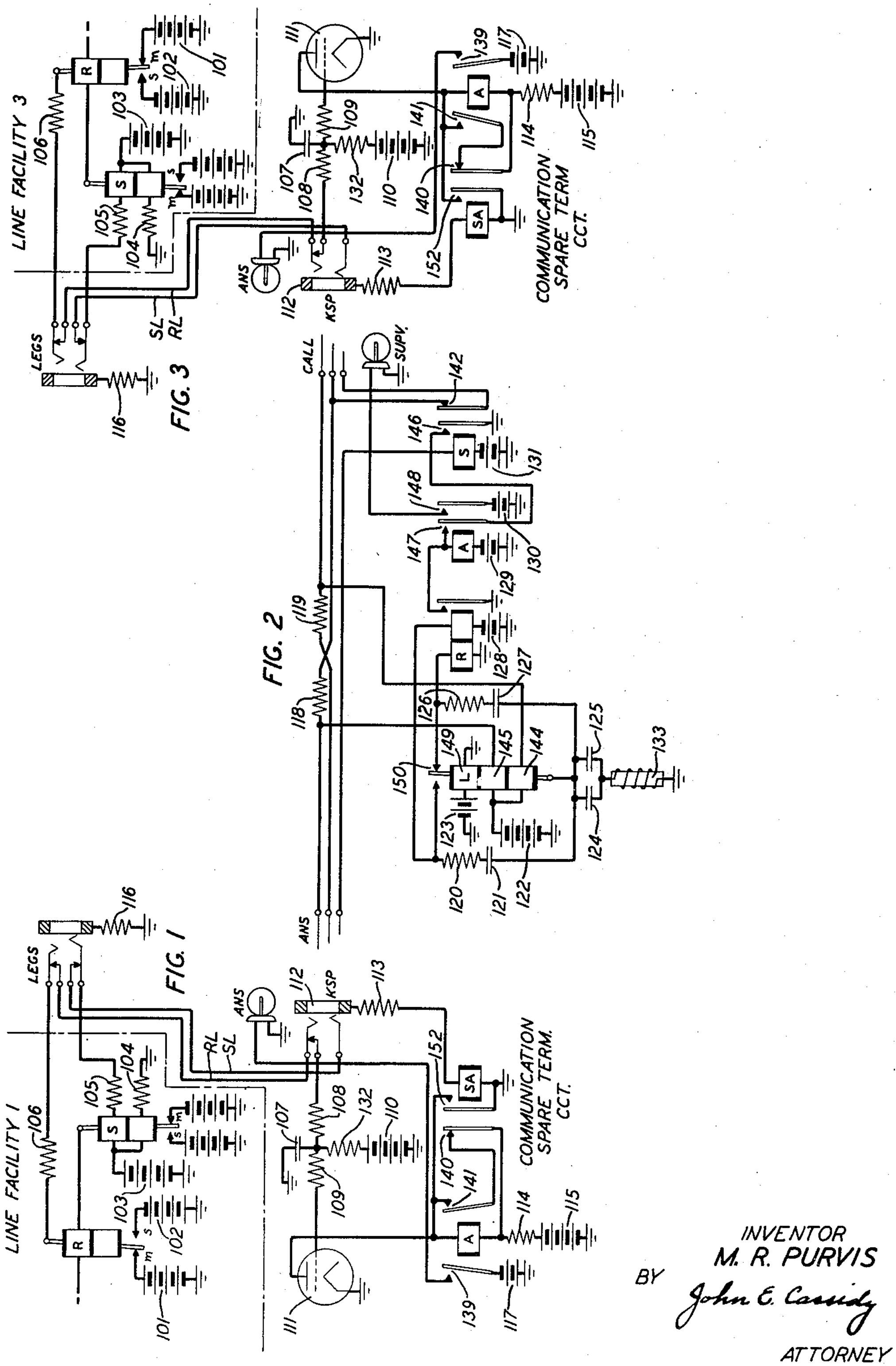
Fig. 2 represents the telegraph connecting cord circuit at an intermediate office.

*Communication spare (KSP) terminating circuit Figs. 1 and 3*

In each of Figs. 1 and 3 relays R and S, resistances 106, 104 and 105 and batteries 101, 102 and 103 are part of the line repeater which terminates in the LEGS and KSP jacks. The LEGS jack is part of the concentration jack circuit and serves principally as a means for patching the line facility out as a spare so that it may be employed commercially in a patron's network. The KSP terminating circuit provides supervisory arrangements for originating and completing calls over spare line telegraph facilities, primarily for maintenance service between service boards.

The terminating circuit is described as follows: In the idle condition the facility, which is full duplex, is transmitting a mark in both directions. A mark is transmitted outward in Figs. 1 and 3 because there is no current flow from battery 103 through the line winding of relay S and resistance 105, as there is no connection at the KSP jacks and the circuits are open thereat. Current flows from battery 103 through the bias winding of relay S and resistance 104 to ground and this current causes the armature of relay S to operate to marking and send a mark over the line. An incoming mark representing the idle condition causes relay R to be operated to marking and this connects positive battery 101 via the armature of relay R, resistance 106, tip springs of the LEGS and KSP jacks, resistances 108 and 109 to the grid of the tube 111. Since the grid is more positive than the cathode of tube 111, the tube will conduct and hold relay A operated by current flow through the winding of the relay and resistance 114 to positive battery 115. When relay A is operated, the ANS lamp circuit is open at contact 139 and the lamp is extinguished. Condenser 107 is charged to a positive potential. When a call signal is incoming, relay R operates to space and connects negative battery 102 through resistance 106 to the grid network consisting of resistances 108, 109 and 132 and condenser 107. Condenser 107 begins to lose its positive charge and the fall in potential of the condenser is applied to the grid of the tube through resistance 109. After the space signal has persisted for a predetermined interval, which may be assumed to be in the order of one second, the grid will have lost its positive potential and become charged sufficiently negative that tube 111 will stop conducting and cause relay A to be released. The rate at which condenser 107 is discharged and charged is regulated by properly proportioning the values of the resistances in the grid network. When relay A releases, contact 139 closes and lights lamp ANS over an obvious circuit, to indicate the presence of an incoming call. The release of relay A also closes a circuit through contact 140 of relay SA and contact 141 of relay A in series that short-circuits the winding of relay A. Relay A is thereby prevented from reoperating when the incoming space signal is superseded by a mark and tube 111 again conducts. Lamp ANS remains lighted until the local attendant answers by connecting the telegraph cord, TLG301, in the manual telegraph cord circuit per Fig. 4 to the KSP jack. At that time relay SA operates from current produced by battery in the sleeve circuit of the telegraph cord circuit. Operation of the manual telegraph cord circuit will be described later. Operation of relay SA opens the short-circuiting path which is in parallel with the winding of relay A. It also connects ground, through contact 152, to the winding of relay A causing relay A to operate and extinguish lamp ANS. The local attendant communicates with the calling office and, when finished, disconnects the manual telegraph cord circuit. Relay SA releases and relay A will be free to release if the incoming signal is a space. Relay A will remain operated, however, if a marking signal is incoming.

*Telegraph connecting cord circuit, Fig. 2*

Figure 4:
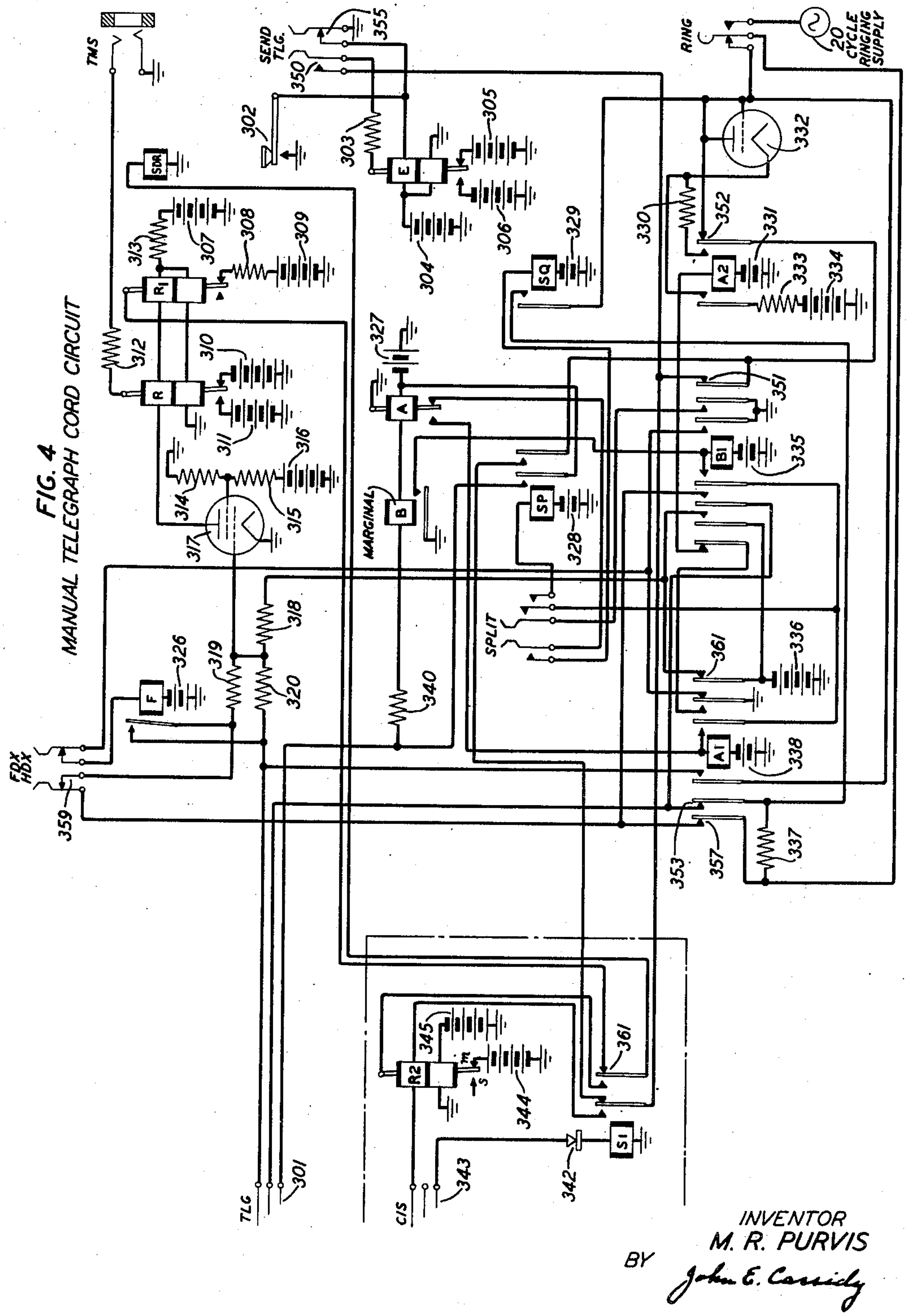
Fig. 4 represents a manual telegraph cord circuit.

If an attendant should answer an incoming call received over the line facility terminated in Fig. 1, using the manual telegraph cord circuit per Fig. 4, only to find that his office is to be a through or intermediate point in a built-up connection to another office, he proceeds to complete the connection as now described. This description applies at any through point in the built-up connection.

The CALL cord of a telegraph connecting cord circuit per Fig. 2 is connected to the KSP jack of a line facility such as Fig. 3 which it will be assumed extends to the called office. Relay S of the CALL cord is released since the circuit through its winding is open at the sleeve of the answering cord ANS which is disconnected at this time. The ring and sleeve of the CALL cord will be interconnected through contact 142 and ground will be connected through the winding of relay SA of the KSP facility, through resistance 113 to the sleeve of the jack, from the sleeve through contact 142 to the ring of the cord circuit, through the ring contacts of jacks KSP and LEGS, resistance 105 and through the line winding of relay S of the facility to battery 103. This will cause relay S to operate to spacing and thereby send a space over the facility to the distant office as a call signal. After approximately two seconds, the attendant disconnects the manual telegraph cord circuit per Fig. 4 from the KSP jack of the facility of Fig. 1 and connects the ANS cord of the telegraph connecting cord circuit per Fig. 2 to this jack. Relay S of the cord circuit operates due to current flow from battery 131, through the relay winding over the sleeve of cord ANS, sleeve of jack KSP, Fig. 1, resistance 113 and the winding of relay SA to ground. Relay SA of Fig. 1 therefore operates at this time. With the operation of relay S of the cord circuit the connection between the ring and sleeve of the CALL cord is opened at contact 142 and transmission of the space signal over the facility of Fig. 3 is interrupted. The attendant at the called office answers the call and communication begins.

Transmission of signals from facility 1 to facility 3 is from the armature of relay R, facility 1, through resistance 106, tip springs of jacks LEGS and KSP, tip conductor of cord ANS, resistance 118, ring of cord CALL, into facility 3, through ring springs of jacks KSP and LEGS, resistance 105 and the line winding of relay S to battery 103. Transmission from facility 3 to facility 1 may be traced in the reverse direction and the signals pass through resistance 119 of the telegraph connecting cord circuit. After the patch has been completed between the facilities 1 and 3 of Figs. 1 and 3, relay SA of facility 1 will be held operated by current, which flows from ground through the winding of relay SA, resistance 113, sleeve of jack KSP, sleeve of cord ANS and the winding of relay S to battery 131. Relay A in Fig. 1 will thus be held operated and the ANS lamp will remain extinguished. In the case of facility 3 operation of the tip spring contacts of jack KSP disconnects the grid network of tube 111 from the RL lead. Tube 111 in line facility 3 will be held conducting by positive battery 110 applied through resistances 132 and 109 to its grid and in the conducting condition the tube will hold relay A operated. Lamp ANS of facility 3 will therefore be maintained extinguished.

The telegraph connecting cord circuit, Fig. 2, includes a disconnect signaling feature which reduces the holding time on the KSP trunks which terminate in Figs. 1 and 3. This feature requires that either the calling or called telegraph service board attendant send a 20-cycle ringing signal upon completion of communication. This ringing signal causes the SUPV lamp associated with the telegraph connecting cord circuit at each intermediate point to light, whether there be one or several Figs. 2 in the tandem connection, as an indication that the cord should be disconnected immediately to release the KSP trunks. The 20-cycle ringing signal is sent from the manual telegraph cord circuit at either the calling or called terminal. Operation of the disconnect signaling feature will now be described.

A ringing signal transmitted by a manual telegraph cord circuit per Fig. 4 connected to a KSP jack, at either terminal, applies ±105 volts at a 20-cycle frequency to the ring conductor of the KSP jack, at the terminal, in a manner to be described, and this causes current to flow in the line winding of the S relay of the facility. Relay S will respond to the voltage alternations of 20-cycle frequency and transmit alternate mark and space pulses over the KSP facility to actuate the armature of the receiving relay R at the associated opposite end of the facility. If the ringing signal is transmitted by the calling office the alternate marking and spacing signals will enter all telegraph connecting cord circuits per Fig. 2 in series in the tandem connection via the tip of the ANS cord. Part of the signaling current entering the tip of the ANS cord will pass through winding 145 of relay L and cause this relay to vibrate. The rest will pass through resistance 118, the ring springs of jacks KSP and LEGS, resistance 105, the line winding of relay S to battery 103. Relay S, Fig. 3, will also respond to the ringing signals. Likewise if the ringing signals are transmitted from the called office they will cause the S relay of the associated KSP facility to vibrate and repeat them over the facilities of the built-up connection. Alternate marking and spacing signals resulting from the ringing signals will enter the CALL cord tip conductor of every telegraph connecting cord circuit in the built-up connection. Part of the signal current will pass through winding 144 of relay L and the rest will pass through resistance 119 and over the ring of the ANS cord, to operate the S relay of the facility of Fig. 1. In any event relay L will vibrate at 20 cycles per second either from current in its upper or lower winding. When the armature of relay L, Fig. 2, engages its left-hand contact, current flows from battery through the right-hand winding of relay R, left-hand contact of relay L, through condensers 124 and 125 in parallel and the winding of inductance 133 to ground. When the armature of relay L engages its right-hand contact, current flows from the tuned circuit comprising inductance 133 and condensers 124 and 125 in parallel through the right-hand contact of relay L and the left-hand winding of relay R. The direction of the flow of current through each of the windings of relay R alternately is such that its effect tends to actuate the armature of relay R, Fig. 2, to engage with its contact. The capacitance of condensers 124 and 125 and the inductance of coil 133 are tuned so that when relay L vibrates at 20 cycles per second there is sufficient current flowing in the windings of relay R in Fig. 2 to cause this relay to operate. If relay L happens to be responding to telegraph signals or is vibrating at some frequency other than 20 cycles, there will be insufficient current to operate relay R. Relay R will thus be operated only when repeated marking and spacing signals are received at the rate of approximately 20 cycles per second. It is also necessary that these signals continue for one or more seconds in order to give relay R time to operate. When relay R operates it closes an obvious circuit to operate relay A which locks up to ground supplied through make contacts 146 and 147 of operated relays S and A. Operation of relay A closes a circuit through contact 148 to light supervisory lamp SUPV which remains lighted until the ANS cord is taken down at which time relay S is released. Prompt disconnection of the telegraph connecting cord circuit frees the KSP trunks for immediate use. Condensers 121 and 127 and resistance 120 and 126 serve as spark protection networks for the contacts of relay L. Winding 149 normally biases the armature of relay L to engage the contact 150 but no current flows in the windings of relay R except while relay L is vibrated.

The manual telegraph cord circuit, Fig. 4, is used for communication purposes between the service board personnel in conjunction with KSP trunk circuits. Operation of this cord circuit in conjunction with KSP trunk circuits will now be described.

When a manual telegraph cord circuit per Fig.

4 is connected to the KSP jack of a spare line facility, such as Fig. 3 for instance, which is terminated in a KSP jack circuit, telegraph cord TLG301 is used. Sleeve current flows from ground in the KSP jack circuit, Fig. 3, through the winding of relay SA, resistance 113, sleeve of the KSP jack, over the sleeve of telegraph cord TLG301, Fig. 4, resistance 340, and through the windings of relays B and A to battery 321. This current flow serves to operate, relay SA in the KSP terminating circuit per Fig. 3, but relays B and A of the cord circuit do not operate because the current is insufficient to operate marginal relay B and is in the wrong direction to operate polar relay A. The manual telegraph cord circuit per Fig. 4 has application to several different kinds of service board jack circuits in addition to those disclosed herein, and it is the purpose of relays B and A to distinguish between the various jack circuits and arrange the cord circuit per Fig. 4 to function properly with any of the circuits with which it is intended to be associated. Connection of cord TLG to the KSP jack circuit causes the tip and normal jack springs to open and disconnect the grid network of tube 111 from receiving leg RL. The line facility per Fig. 3, the sending relay S of which is sending a mark to the distant office for the idle condition, continues to send a mark until the attendant operates the sending telegraph key, SEND TLG key, in the telegraph cord circuit per Fig. 4, while leaving telegraph key 302 open, which effects the transmission of a spacing or call signal. The spacing or call signal is transmitted because relay E, Fig. 4, will be held to its left-hand or spacing contact under the influence of current in its lower or biasing winding, over an obvious circuit, while no current flows in its upper winding as contact 355 and key 302 are open. In this condition current will flow from negative battery 306, through the armature of relay E, resistance 303, closed contacts 350 of key SEND TLG, back contacts 351 of relay B1, back contacts 352 of relay A2, closed contacts of unoperated key RING, resistance 337, back contacts 353 of relay A1 to the ring of cord TLG. From the ring of cord TLG the current flows over the SL lead through resistance 105 and the line winding of relay S in the line repeater to battery 103. This current flow will overcome the effect of the bias current, flowing from battery 103, through the biasing winding of relay S and resistance 104 to ground, and cause this relay to operate to spacing. A space signal, therefore, will be transmitted over the facility and serve as a call signal. After sending the call signal for several seconds the attendant closes telegraph key 302 to send a mark. This causes current to flow from battery 304 through the top winding of relay E and closed telegraph key 302 to ground and operates relay E to marking. Positive battery 305 replaces negative battery 306 in the circuit traced above. Battery 305 in Fig. 4 now opposes equal battery 103 in Fig. 3 and no current flows in the line winding of relay S. Relay S, therefore, operates to marking under the influence of current in its biasing winding. The circuit is now ready to receive a response from the called office.

Signals from the called office are repeated by the R relay of the line facility Fig. 3, and pass over the RL lead, through resistance 106, tip springs of jacks LEGS and KSP, over the tip of the cord circuit Fig. 4 and through resistance 320 to the grid of tube 317. Positive potential from source 103 will also be applied through the ring conductor of the KSP jack and the ring conductor of the cord to the grid of tube 317. As a result the grid of tube 317 is now held positive by connection to battery 103 in the line repeater and battery 305 in the cord circuit. The connection from the ring conductor of the cord to the grid of the tube may be traced from the ring conductor of the cord through back contacts 353 of relay A1, resistance 337, back contacts 357 of relay A1, closed contacts 359 of full duplex-half duplex key FDX—HDX and through resistance 319 to the grid. The grid of tube 317 has a second continuous source of negative potential which is obtained from negative battery 336 through back contacts 361 of relay A1 and resistance 318. This negative battery branch compensates for the steady positive potential applied by the ring of the cord through resistance 319 and causes the grid potential to be centered at the correct potential for the reception of signals from the RL lead of the facility. Signals from the distant office will accordingly cause tube 317 to conduct for a mark and cut off for a space. The screen grid of tube 317 is connected to a potentiometer consisting of positive battery 316 and resistances 315 and 314. This potentiometer is adjusted so that a plate current of approximately 30 mils flows from positive battery 307 through resistance 313, the line windings of relays R1 and R and the plate-cathode circuit of tube 317 to ground. With a biasing current of approximately 15 mils flowing through their lower or biasing windings, these relays respond to incoming signals. Relay R is arranged to transmit polar signals through resistance 312 to the transmission measuring set which may be connected to the transmission measuring set jack TMS. Relay R1 transmits on a neutral basis through resistance 308, back contacts 361 of relay S1 and the winding of sounder SDR of the telegraph set to ground.

The local attendant sends to the distance office by opening and closing telegraph key 302 which actuates relay E. Relay E transmits over the circuit previously traced and causes relay S in the line repeater to respond and repeat the signals outward over the facility. Current flow through the line winding of relay S is limited to the optimum value by series resistances 303 and 337 in Fig. 4 and resistance 105 in Fig. 3. The receiving element of the telegraph cord circuit responds to outgoing signals and provides local copy. In this case the out going signals are applied to the grid of tube 317 via resistance 319 while continuous positive and negative potentials are applied to the grid through resistances 320 and 318 respectively. The potential applied through resistance 320 comes from the RL lead of the facility which is marking and that applied through resistance 318 is from negative battery 336. The grid potential of the tube is therefore properly centered for reception of outgoing signals.

Upon completion of communication and before the cord circuit is disconnected from the KSP jack, the attendant may wish to send a 20-cycle ringing signal over the KSP facilities to notify attendants at through points on the built-up connection that the telegraph connecting cord circuits per Fig. 2, which interconnects the line facilities such as Fig. 1 and 3 at the intermediate points should be disconnected. This is accomplished by operating key RING momentarily which applies ±105 volts, 20-cycle signals via resistance 337 and back contacts 353 of relay A1 to the ring conductor of the cord. These alternating voltages are applied through the line winding of relay S in the line repeater and cause the relay to respond and send out alternate mark and space pulses. These pulses pass through the telegraph connecting cord circuit at each through point and light the locked-in supervisory lamp as previously discussed.

Cord C1S, relays S1, F, SQ, SP, A2 and R2, tube 332 and keys FDX—HDX and SPLIT serve no useful function when the cord circuit is connected to a KSP jack. These apparatus units function when the circuit per Fig. 4 functions with other circuits in the telegraph service board.

Figure 5:
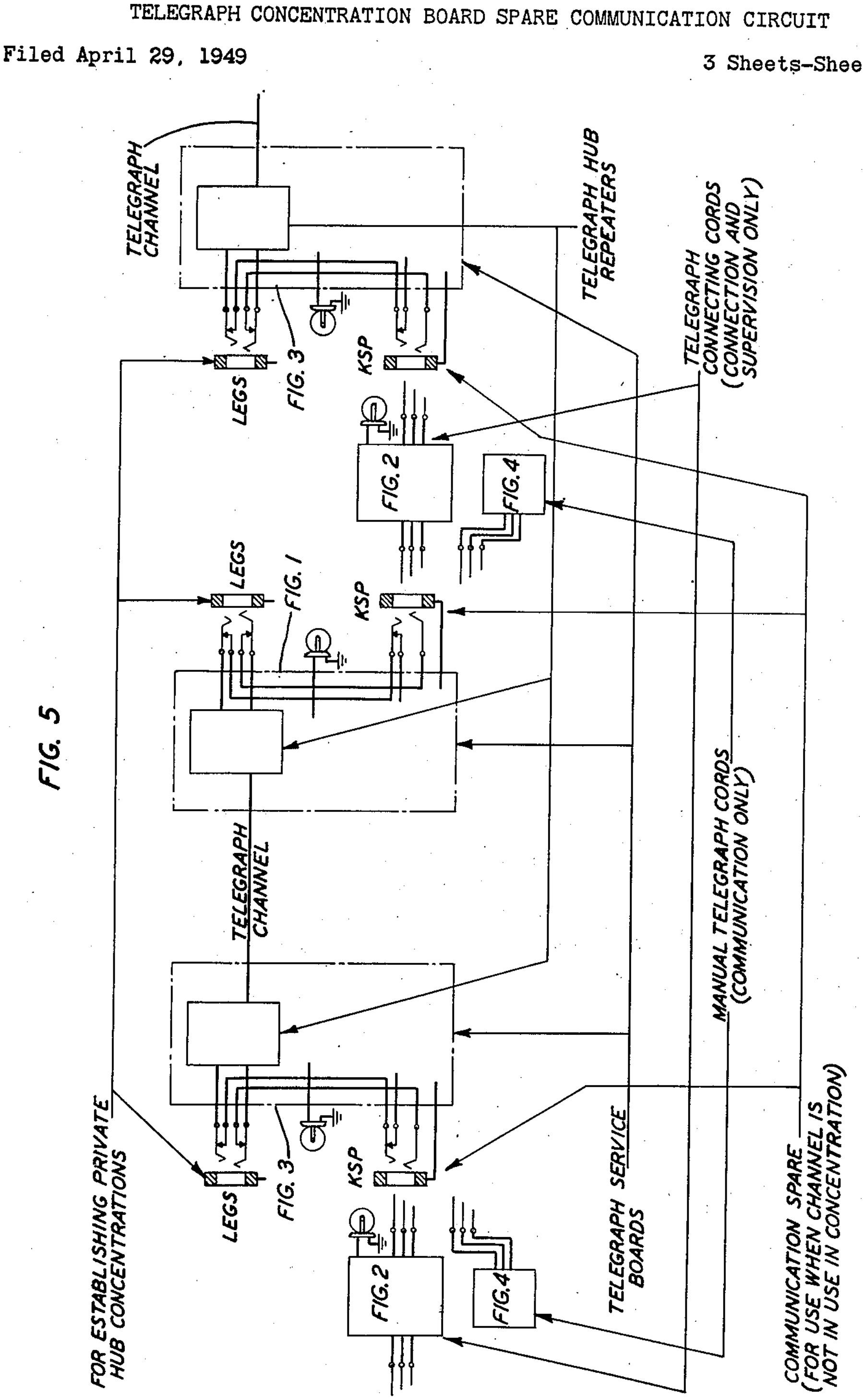
Fig. 5 is a schematic diagram of captioned rectangles showing the relationship of Figs. 1 to 4 in a typical arrangement.

Fig. 5 is a diagram showing the relationship of Figs. 1 to 4 in a typical arrangement which should be understood from the foregoing. In this figure three service boards are shown interconnected by two telegraph channels each of which channels is terminated at each switchboard in a jack designated LEGS and in another designated KSP or communication spare. The channels and their terminations, as explained in the foregoing, may be interconnected through their respective LEGS jacks to other channels to form a private line concentration group at each telegraph service board. Each of the present channels is equipped at each service board with an individual hub-type telegraph repeater so that it may serve in such a concentration group. At times, when it is not employed as part of a hub-type concentration group, it is available for communication between the personnel at the switchboards.

One channel may serve for communication between two switchboards or a number of switchboards in tandem may be interconnected by a number of channels. The manual telegraph cord per Fig. 4 is employed at each end of the connection for communication. In a tandem connection the manual telegraph cord per Fig. 4 is employed to receive the information necessary to establish the connection and the telegraph connecting cord is employed as a connecting and supervisory link only at the tandem points.

What is claimed is:

1. In a hub telegraph repeater system, a telegraph switchboard, a first and a second telegraph channel connected through a first and a second individual hub-type telegraph repeater at said switchboard, means of access to each of said channels for connecting each of said channels to hub-type repeater concentration groups at said switchboard at a first time, a first telegraph cord connectable to each of said channels, said cord including telegraph communication means to enable an attendant at said switchboard to communicate over each of said channels preparatory to establishing a tandem connection through said channels, a second interconnecting cord devoid of said communication means, a tandem connection extending through said first channel, said second cord and said second channel at a second time, a supervisory signal control and a supervisory signal both in said second cord, said control responsive to signals transmitted over either of said channels.

2. In a telegraph system, a telegraph switchboard having two telegraph channels terminated thereat, each of said channels individually equipped with a hub-type telegraph repeater to permit its connection into hub telegraph repeater concentration groups at a first time, means at said switchboard for interconnecting said channels in a tandem connection extending through a plurality of switchboards at a second time, said means comprising a first telegraph cord, having switchboard attendant telegraph communication means therein, connectable to said channels individually for the transmission of information necessary to establish said tandem connection, said means comprising also a second patching cord having a supervisory signal, and a supervisory signal control responsive to supervisory signals transmitted over a channel in said tandem connection, said patching cord interconnecting said channels, said patching cord devoid of attendant telegraph communication means.

3. In a telegraph system, two telegraph channels each having an individual hub-type telegraph repeater, means of access to each of said channels at said switchboard for interconnecting said channels in hub-type concentration groups at said switchboard, a telegraph switchboard attendant's communication cord including means for enabling an attendant at said switchboard to communicate over each of said channels separately preparatory to establishing a single tandem connection through said channels, a single patching cord connectable to each of said channels for serving as a link in said tandem connection, a supervisory signal and a supervisory signal control in said patching cord responsive to supervisory signals transmitted over said channel.

MATTHEW R. PURVIS.

REFERENCES CITED

The following references are of record in the file of this patent:

UNITED STATES PATENTS

| Number | Name | Date |
|---|---|---|
| 1,834,910 | Blanton | Dec. 1, 1931 |
| 1,835,549 | Wishart | Dec. 8, 1931 |
| 1,986,679 | Lewis | Jan. 1, 1935 |
| 2,173,551 | Fitch | Sept. 19, 1939 |
| 2,228,890 | Singer | Jan. 14, 1941 |
| 2,349,586 | Bonorden et al. | May 23, 1944 |
| 2,352,272 | Large et al. | June 27, 1944 |
| 2,360,040 | Dahlbom et al. | Oct. 10, 1944 |
| 2,464,371 | Blyholder | Mar. 15, 1949 |